United States Patent [19]
Barthold et al.

[11] 3,928,602
[45] Dec. 23, 1975

[54] SUBSTITUTED PHENOXYMALONIC ACIDS, ESTERS THEREOF AND HYPOLIPAEMIC AGENTS CONTAINING THE SAME FOR LOWERING LIPID LEVELS

[75] Inventors: Dag Vilhelm Barthold, Solna; Johan Richard Dahlbom, Sodertalje; Harry Olof Magnusson, Bandhagen; Berndt Olof Harald Sjöberg, Sodertalje, all of Sweden

[73] Assignee: Astra Lakemedel Aktiebolag, Sodertalje, Sweden

[22] Filed: Oct. 16, 1973

[21] Appl. No.: 406,920

[30] Foreign Application Priority Data
Nov. 1, 1972 Sweden.............................. 14117/72

[52] U.S. Cl. ............ 424/308; 260/473 G; 260/470; 260/521; 424/303; 424/317
[51] Int. Cl.² ................A61K 31/19; A61K 31/235; A61K 31/255
[58] Field of Search............................ 424/308, 317

[56] References Cited
UNITED STATES PATENTS
3,474,128 10/1969 Griot.................................. 424/308
3,567,742 3/1971 Cavalleri et al..................... 424/308

OTHER PUBLICATIONS
Chemical Abstracts 73:65979c (1970).

Primary Examiner—Stanley J. Friedman
Attorney, Agent, or Firm—Brumbaugh, Graves, Donohue & Raymond

[57] ABSTRACT
Compounds of the general formula

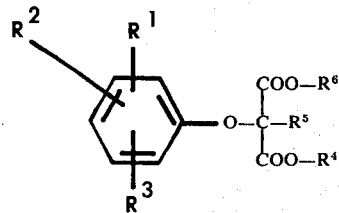

wherein $R_1$ is a halogen, alkyl, alkoxy, $CF_3$ or alkyl sulphonyl group, wherein $R_2$ and $R_3$ are hydrogen or halogen, alkyl, alkoxy, $CF_3$ or alkyl sulphonyl groups, wherein $R_4$ and $R_6$ are hydrogen or alkyl groups and wherein $R_5$ is an alkyl group. The compounds are useful as hypolipaemic agents.

26 Claims, No Drawings

SUBSTITUTED PHENOXYMALONIC ACIDS, ESTERS THEREOF AND HYPOLIPAEMIC AGENTS CONTAINING THE SAME FOR LOWERING LIPID LEVELS

FIELD OF INVENTION

The present invention relates to compounds having valuable therapeutical properties particularly as hypolipemic agents, and therapeutically acceptable salts thereof. The invention also relates to methods for the preparation of the compounds, to pharmaceutical preparations containing them and to a method for the treatment of certain diseases by administering a therapeutically effective amount of a compound of the invention in association with a pharmaceutically acceptable carrier.

BACKGROUND OF INVENTION

In view of accumulating evidence indicating that excessive serum lipid concentration is correlated to basic pathogenetic mechanisms and to symptoms of several diseases such as vascular diseases, diabetes mellitus, and hyperthyroidism, lowering of serum lipid concentration is important during treatment of such diseases.

A compound used for the treatment of hyperlipemia is ethyl-α-(p-chlorophenoxy)isobutyrate, which compound is also named Atromidin. This compound, however, suffers from the disadvantage of giving only a minor decrease of the cholesterol concentration. Pharmaceuticals with ability to decrease cholesterol levels in mammals including man are known, but because of the possible complications involved in simultaneous administration of two different drugs it would be of great advantage to use a compound with the ability to give a combined lowering of both cholesterol and triglyceride concentration. The main object of the present invention is to provide compounds with such beneficial properties of lowering both cholesterol levels and triglyceride levels in mammals including man. Another object of the invention is to provide compounds which have a lowering effect on the serum level of triglycerides in mammals including man.

DETAILED DESCRIPTION OF INVENTION

According to the present invention it has surprisingly been found, that compounds of the general formula

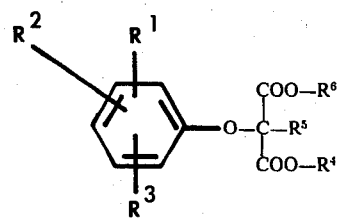

I and therapeutically acceptable salts thereof, in which formula $R^1$, is selected from the group consisting of halogen such as F, Cl, Br and I, alkyl groups containing from 1 to 4 carbon atoms, alkoxy groups containing from 1 to 4 carbon atoms, $CF_3$ and alkyl sulphonyl groups containing from 1 to 3 carbon atoms in the alkyl group; wherein $R^2$ and $R^3$ are the same or different and selected from the group consisting of H, halogen such as F, Cl, Br and I, alkyl groups containing from 1 to 4 carbon atoms, alkoxy groups containing from 1 to 4 carbon atoms, $CF_3$ and alkyl sulphonyl groups containing from 1 to 3 carbon atoms in the alkyl group; wherein $R^4$ and $R^6$ are the same or different and selected from the group consisting of hydrogen and alkyl groups containing from 1 to 4 carbon atoms; and wherein $R^5$ is an alkyl group containing from 1 to 4 carbon atoms; can be used for lowering of serum triglyceride concentrations in animals including man, and that certain compounds included in the formula I give a combined lowering of both serum cholesterol and serum triglycerides. Any of the radicals $R^1$, $R^2$ and $R^3$ can be located in any of the positions 2, 3, 4, 5 and 6 on the benzene ring.

Illustrative examples of alkyl groups $R^1$, $R^2$, $R^3$, $R^4$, $R^5$ and $R_6$ are methyl, ethyl, propyl, isopropyl, n-butyl, isobutyl, tertiary butyl.

Illustrative examples of alkoxy groups $R^1$, $R^2$ and $R^3$ are methoxy, ethoxy, propoxy, isopropoxy, n-butoxy, isobutoxy, t-butoxy.

Illustrative examples of alkylsulphonyl groups $R^1$, $R^2$ and $R^3$ are methylsulphonyl, ethylsulphonyl, propylsulphonyl, isopropylsulphonyl.

Illustrative examples of substitutions in the benzene ring are

| | |
|---|---|
| 2-$CH_3$ | 2-$OCH_3$ |
| 3-$CH_3$ | 3-$OCH_3$ |
| 4-$CH_3$ | 4-$OCH_3$ |
| 5-$CH_3$ | 5-$OCH_3$ |
| 6-$CH_3$ | 6-$OCH_3$ |
| 2-$C_2H_5$ | 2-$OC_2H_5$ |
| 3-$C_2H_5$ | 3-$OC_2H_5$ |
| 4-$C_2H_5$ | 4-$OC_2H_5$ |
| 5-$C_2H_5$ | 5-$OC_2H_5$ |
| 6-$C_2H_5$ | 6-$OC_2H_5$ |
| 2-$CH_2CH_2CH_3$ | 2-$OCH_2CH_2CH_3$ |
| 3-$CH_2CH_2CH_3$ | 3-$OCH_2CH_2CH_3$ |
| 4-$CH_2CH_2CH_3$ | 4-$OCH_2CH_2CH_3$ |
| 5-$CH_2CH_2CH_3$ | 5-$OCH_2CH_2CH_3$ |
| 6-$CH_2CH_2CH_3$ | 6-$OCH_2CH_2CH_3$ |
| 2-$CH(CH_3)_2$ | 2-$OCH(CH_3)_2$ |
| 3-$CH(CH_3)_2$ | 3-$OCH(CH_3)_2$ |
| 4-$CH(CH_3)_2$ | 4-$OCH(CH_3)_2$ |
| 5-$CH(CH_3)_2$ | 5-$OCH(CH_3)_2$ |
| 6-$CH(CH_3)_2$ | 6-$OCH(CH_3)_2$ |
| 2-$CH_2CH_2CH_2CH_3$ | 2-$OCH_2CH_2CH_2CH_3$ |
| 4-$CH_2CHCH_3$ | 2-$OCH_2CHCH_2CH_3$ |
| $\quad\ |$ | $\quad\ |$ |
| $CH_3$ | $CH_3$ |
| 2-F | 2,3-di-$CH_3$ |
| 3-F | 2,4-di-$CH_3$ |
| 4-F | 2,5-di-$CH_3$ |
| 5-F | 2,6-di-$CH_3$ |
| 6-F | 2-$CH_3$-3-Cl |
| 2-Cl | 2-$CH_3$-4-Cl |
| 3-Cl | 2-$CH_3$-5-Cl |
| 4-Cl | 2-$CH_3$-6-Cl |
| 5-Cl | 2-$CH_3$-6-$CF_3$ |
| 6-Cl | 2-$CH_3$-4-$CF_3$ |
| 2-Br | 2-$CH_3$-4-F |
| 3-Br | 2-$CH_3$-4-Br |
| 4-Br | 2-$CH_3$-4-I |
| 5-Br | 2-$OCH_3$-4-Cl |
| 6-Br | 2-$OCH_3$-4-Br |
| 2-I | 2-$OCH_3$-4-F |
| 3-I | 2-$OCH_3$-4-I |
| 4-I | 2-$CH_3$-4-$CH_3SO_2$ |
| 5-I | 2-$CH_3$-4,6-di-Cl |
| 6-I | 2-$CH_3$-4,6-di-I |
| 2-$CF_3$ | 2,3-di-$CH_3$-6-Cl |
| 3-$CF_3$ | |
| 4-$CF_3$ | |
| 5-$CF_3$ | |
| 6-$CF_3$ | |

The compounds of the formulas

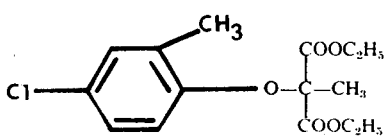

and

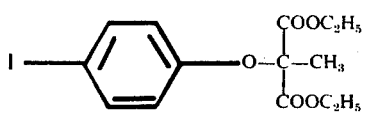

are the preferred compounds of the invention because of their capability to lower simultaneously serum levels of cholesterol and triglycerides.

The compounds according to the present invention are prepared in manner known per se by reacting a compound of the formula

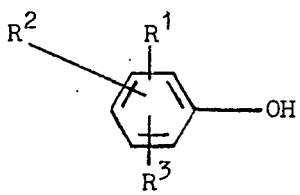

in which formula $R^1$, $R^2$ and $R^3$ have the meaning specified above, with an α-alkylmalonic acid ester of the formula

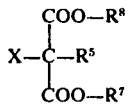

in which formula $R^5$ has the meaning specified above, $R^7$ and $R^8$ are alkyl groups containing from 1 to 4 carbon atoms, and wherein X is a reactive group capable of reacting with the hydroxy group in the compound of the formula IV with formation of an ether linkage whereafter, if desired the alkyl radicals $R^7$ and $R^8$ in the compound of the formula

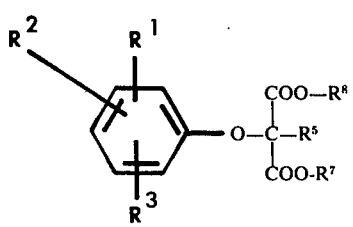

are replaced by hydrogen by hydrolysing the compound of the formula VI in manner known per se.

It is necessary that the carboxyl groups are protected by esterification during the reaction between the compound of the formula IV and the compound of the formula V.

Examples of reactive groups X are Cl, Br, I, paratoluensulphonyloxy, and methylsulphonyloxy. The reaction is preferably carried out in presence of a base such as alkali alkoxides, alkali carbonates, alkali hydrides, alkali amides.

Compounds of the formula I wherein one or both of the radicals $R^4$ and $R^6$ are hydrogen can be converted into salts by reaction with an appropriate base. Examples of salts of said acids are the alkali metal or alkaline earth metal salts such as the sodium, potassium or calcium salts.

In clinical practice the compounds of the present invention will normally be administered orally or by injection in the form of a pharmaceutical preparation comprising the active ingredient in the form of the original compound or optionally in the form of a pharmaceutically acceptable salt thereof, in association with a pharmaceutically acceptable carrier which may be a solid, semi-solid or liquid diluent or an ingestibel capsule, and such preparations comprise a further aspect of the invention. Usually the active substance will comprise between 0,1 and 95 percent by weight of the preparation, for example between 0,5 and 20 percent for preparations intended for injection and between 0.1 and 50 percent for preparations intended for oral administration.

To produce pharmaceutical preparations in the form of dosage units for oral application containing a compound of the invention in the form of the original compound or a pharmaceutically acceptable salt thereof, the active ingredient may be mixed with a solid, pulverulent carrier, for example lactose, saccharose, sorbitol, mannitol, a starch such as potato starch, corn starch, amylopectin, laminaria powder or citrus pulp powder, a cellulose derivative or gelatine, and also may include lubricants such as magnesium or calcium stearate or a Carbowax or polyethylene glycols and compressed to form tablets or centers for dragees. If dragees are required, the centers may be coated, for example with concentrated sugar solutions which may contain gum arabic, talc and/or titanium dioxide, or alternatively with a lacquer dissolved in easily volatile organic solvents or mixtures of organic solvents. Dyestuffs can be added to these coatings, for example, to distinguish between different contents of active substance. For the preparation of soft gelatine capsules (pearl-shaped closed capsules) consisting of gelatine and, for example, glycerol, or similar closed capsules, the active substance may be admixed with a Carbowax. Hard gelatine capsules may contain granulates of the active substance with solid, pulverulent carriers such as lactose, saccharose, sorbitol, mannitol, starches (for example potato starch, corn starch or amylopectin), cellulose derivatives or gelatine, and may also include magnesium stearate or stearic acid.

Liquid preparations for oral application may be in the form of syrups or suspensions, for example solutions containing from about 0.1 to 20 percent by weight of active substance, sugar and a mixture of ethanol, water, glycerol, propyleneglycol and optionally, aroma, saccharine and/or a dispersing agent such as carboxymethyl cellulose.

For parenteral application by injection preparations may comprise an aqueous solution of a water soluble pharmaceutically acceptable salt of the active substance desirably in a concentration of 0.5–10 percent and optionally also a stabilizing agent and/or buffer substance in aqueous solution, and NaCl to make the solution isotonic. Dosage units of the solution may advantageously be enclosed in ampoules.

The dosage used is dependent on individual requirements but the administration of about 0.1–1 g of the active substance 1-2 times a day may be used as therapeutical treatment of hyperlipaemia in man. The said dosage is primarily intended for oral administration.

The following examples are intended solely to illustrate the invention and should not be construed as limiting the scope of the claims in any way.

EXAMPLE 1

Preparation of
α-(4-chloro-2-methylphenoxy)-α-methyl-malonic acid diethylester

To a solution of 0.1 mole of 4-chloro-2-metylphenol in 90 ml acetone and 10 ml toluene was added under stirring 0.11 mole potassium carbonate and thereafter dropwise 0.12 mole α-chloro-α-methyl-malonic diethylester. The reaction mixture was boiled under stirring for 24 hours. After filtering the solvent was evaporated, 50 ml toluene was added and the toluene phase was washed with 90 % NaOH (4×25 ml) and water (4×25 ml). The organic phase was dried over magnesium sulphate. After filtering the solvent was removed in vacuum and the remainder distilled in vacuum. The product obtained, α-(4-chloro-2-methylphenoxy)-α-methyl-malonic acid diethylester had a boiling point of 119°–120°C at a pressure of 0.3 mm Hg. The refraction index $n_D^{22}$ was 1.4962. Yield: 59 percent.

EXAMPLE 2

In a manner analogous with that described in example 1 compounds of the formula

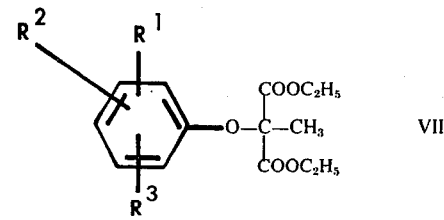

were prepared. The physical data of the compounds are given in Table I below. For completeness also the compound prepared in Example 1 is included.

TABLE I.

| Physical data for compounds according to the invention | | | | |
|---|---|---|---|---|
| Compound No. | $R^1$ | $R^2$ | $R^3$ | B.p. °C (mm Hg) |
| 1 | 2-$CH_3$ | H | H | 121–122 (0.5) |
| 2 | 3-$CH_3$ | H | H | 128–129 (0.8) |
| 3 | 4-$CH_3$ | H | H | 122–123 (0.2) |
| 4 | 2-Cl | H | H | 129–130 (0.4) |
| 5 | 4-Cl | H | H | 123–124 (0.2) |
| 6 | 3-I | H | H | 141–142 (0.5) |
| 7 | 4-I | H | H | 141–142 (0.4) |
| 8 | 2-$OCH_3$ | H | H | 138–139 (0.8) |
| 9 | 3-$OCH_3$ | H | H | 135–136 (0.4) |
| 10 | 4-$CF_3$ | H | H | 140–142 (0.4) |
| 11 | (PC)4-$CH_3SO_2$ | H | H | 145–146 (0.3) |
| 12 | 2-$CH_3$ | 3-$CH_3$ | H | 137–138 (1.1) |
| 13 | 2-$CH_3$ | H | 4-$CH_3$ | 118–119 (0.4) |
| 14 | 2-$CH_3$ | H | 5-$CH_3$ | 122–123 (0.6) |
| 15 | 3-$CH_3$ | H | 4-$CH_3$ | 130–131 (0.4) |
| 16 | 3-$CH_3$ | H | 5-$CH_3$ | 119–120 (0.4) |
| 17 | 2-Cl | H | 6-$CH_3$ | 138–139 (0.5) |
| 18 | 2-$CH_3$ | H | 4-Cl | 119–120 (0.3) |
| 19 | 3-$CH_3$ | 4-Cl | H | 122–123 (0.4) |
| 20 | 2-$CH_3$ | H | 4-F | 135–136 (0.5) |
| 21 | 2-Cl | 4-Cl | H | 135–136 (0.4) |

EXAMPLE 3

Preparation of α-(4-chlorophenoxy)-α-methyl-malonic acid dimethylester

To a solution of 0.1 moles 4-chlorophenol in 150 ml acetone and 25 ml toluene was added 0.1 mole sodiummethoxide and the mixture was stirred at room temperature for 1 hour. Thereafter 0.12 mole of α-(p-toluenesulphonyloxy)-α-methyl-malonic acid dimethylester was added in small portions, whereafter the mixture was boiled under reflux for 24 hours. The reaction mixture was worked up in the same way as described in Example 1. The product had a boiling point of 127°–128°C at a pressure of 0.3 mm Hg. The refraktion index $n_D^{22}$ was 1.4980. Yield: 48 percent.

The following examples illustrate how the compound of the invention can be incorporated in pharmaceutical compositions, in which examples the active substance is exemplified by the preferred compounds.

EXAMPLE 4

Preparation of soft gelatine capsules 500 g of α-(4-chloro-2-methylphenoxy)-α-methyl-malonic acid diethylester were mixed with 500 g of corn oil whereafter the mixture was filled in soft gelatine capsules, each capsule containing 100 mg of the mixture (i.e. 50 mg of active substance).

EXAMPLE 5

Preparation of soft gelatine capsules 500 g of α-(4-chloro-2-methylphenoxy)-α-methylmalonic acid diethyl ester were mixed with 750 g of peanut oil whereafter the mixture was filled in soft gelatine capsules, each capsule containing 125 mg of the mixture (i.e. 50 mg of active substance).

EXAMPLE 6

Preparation of tablets 5 kg of α-(4-chloro-2-methylphenoxy)-α-methylmalonic acid diethyl ester were mixed with 2 kg of silicon dioxide of the trademark Aerosil, whereafter 4.5 kg of potato starch and 5 kg of lactose were mixed in and the mixture moistened with a starch paste prepared from 0.5 kg of potato starch and distilled water, whereafter the mixture was granulated through a sieve. The granulate was dried and sieved whereafter 0.2 kg of magnesium stearate were mixed in. Finally the mixture was pressed into tablets, each weighing 172 mg.

EXAMPLE 7

Preparation of an emulsion 100 g of α-(4-chloro-2-methylphenoxy)-α-methylmalonic acid diethyl ester were dissolved in 2500 g of peanut oil. From the solution thus obtained, 90 g of gum arabic, aroma and colour (q.s.) and 2500 g of water an emulsion was prepared.

EXAMPLE 8

Preparation of a syrup 100 g of α-(4-chloro-2-methylphenoxy)-α-methylmalonic acid diethyl ester were dissolved in 300 g of 95 % ethanol where 300 g of glycerol, aroma and colour (q.s.) and water 1000 ml were mixed in. A syrup was thus obtained.

EXAMPLE 9

Preparation of a solution 100 g of α-(4-iodophenoxy)-α-methylmalonic acid diethyl ester were dissolved in 2000 g of polyoxyethylene sorbitan monooleate, whereafter aroma and colour (q.s.) and water to 5000 ml were mixed in. A drop solution was thus obtained.

EXAMPLE 10

Preparation of effervescent tablets 100 g of α-(4-chloro-2-methylphenoxy)-α-methylmalonic acid diethyl ester 140 g of powdered citric acid, 110 g of powdered sodium hydrogen carbonate, 3.5 g of magnesium stearate and aroma (q.s.) were mixed and the mixture was pressed into tablets, each containing 100 mg of active substance.

EXAMPLE 11

Preparation of a drop solution 100 g of α-(4-chloro-2-methylphenoxy)-α-methylmalonic acid diethyl ester were mixed with 300 g of ethanol, whereafter 300 g of glycerol, water to 1000 ml aroma and colour (q.s) and 0.1 N sodium hydroxide solution (to pH 4.5–5.5) were added while stirring. A drop solution was thus obtained.

EXAMPLE 12

Preparation of a sustained release tablet 200 g of α-(4-iodophenoxy)-α-methylmalonic acid diethyl ester were melted together with 50 g of stearic acid and 50 g of carnauba wax. The mixture thus obtained was cooled and ground to a particle size of maximum 1 mm. The mass thus obtained was mixed with 5 g of magnesium stearate and pressed into tablets each weighing 305 mg. Each tablet thus contains 200 mg of active substance.

BIOLOGICAL TESTS

A. Effect on the level of cholesterol and triglycerides in mouse plasma

Male mice of the N.M.R.I. strain with bodyweights of 20–22 g were fed ground mouse chow supplemented with test substances (0.15–0.3 % w/w) for 6 days. Twelve mice forming one group were housed in the same cage. For each test group one group simultaneously served as control. At the end of the experiment the mice were decapitated and blood from 3 mice was pooled for the determination of cholesterol and triglycerides.

Analysis of plasma lipids

Total cholesterol and triglycerides were determined by methods from Technicon for Autoanalyzer, described in Technicon Laboratory Method File no. 24a resp. no. 78.

Diet

The mice were fed commercial mouse chow obtained from Astra-Ewos, Sodertalje, Sweden. The control group received mouse chow with no addition of active compounds.

Results

The results are collected in Table II below. All compounds reduce the level of triglycerides in plasma, and the compounds 2, 7 and 18 also lower the cholesterol level.

The cholesterol and triglyceride values in the control groups vary between 141 and 182 mg/100 ml and between 1.00 and 1.88 μmole/ml respectively. These fluctuations are mainly due to seasonal variations during the course of the tests which extended for a period of more than 18 months.

The food intakes were measured indirectly by observing the change of body weight during the experiment. No difference could be observed between the test groups and control groups.

TABLE II

| | | Plasma levels of total cholesterol and triglycerides after administration of test substance. | | | | | | | |
|---|---|---|---|---|---|---|---|---|---|
| | | Total Cholesterol | | | | Triglycerides | | | |
| Compound (numbered as in Ex. 2) | Per cent test substance in diet | Test group mg/100 ml plasma | Control group mg/100 ml plasma | Ratio test/control (percent) | Test group μmole/ml plasma | Control group μmole/ml plasma | Ratio test/control (percent) | Average weight gain (g) per animal after 6 days | |
| | | | | | | | | Test group | Control group |
| 1 | 0.2 | 176±7 | 159±5 | 111 | 0.62±0.06 | 1.21±0.22 | 51 | 2 | 2 |
| 2 | 0.15 | 147±4 | 159±5 | 93 | 0.73±0.04 | 1.21±0.22 | 60 | 1 | 2 |

TABLE II-continued

| Compound (numbered as in Ex. 2) | Per cent test substance in diet | Total Cholesterol | | | Triglycerides | | | Average weight gain (g) per animal after 6 days | |
|---|---|---|---|---|---|---|---|---|---|
| | | Test group mg/100 ml plasma | Control group mg/100 ml plasma | Ratio test/control (percent) | Test group μmole/ml plasma | Control group μmole/ml plasma | Ratio test/control (percent) | Test group | Control group |
| 3 | 0.3 | 183±3 | 148±8 | 123 | 1.15±0.09 | 1.88±0.08 | 61 | 2 | 3 |
| 4 | 0.3 | 159±6 | 151±3 | 105 | 1.32±0.10 | 1.49±0.08 | 89 | 3 | 3 |
| 5 | 0.3 | 151±3 | 151±3 | 100 | .06±0.10 | 1.49±0.08 | 71 | 2 | 3 |
| 6 | 0.3 | 189±10 | 180±4 | 105 | 0.55±0.02 | 1.00±0.10 | 55 | 1 | 2 |
| 7 | 0.3 | 151±5 | 182±8 | 83 | 0.99±0.07 | 1.27±0.10 | 78 | 2 | 3 |
| 8 | 0.2 | 176±9 | 169±3 | 104 | 1.07±0.10 | 1.40±0.06 | 76 | 3 | 2 |
| 9 | 0.3 | 160±8 | 161±3 | 100 | 0.71±0.09 | 1.11±0.18 | 64 | 2 | 2 |
| 12 | 0.3 | 197±4 | 169±3 | 117 | 0.99±0.07 | 1.40±0.06 | 71 | 2 | 2 |
| 13 | 0.3 | 189±5 | 182±8 | 104 | 0.78±0.03 | 1.27±0.10 | 61 | 3 | 3 |
| 14 | 0.3 | 176±7 | 159±5 | 104 | 0.79±0.05 | 1.21±0.22 | 56 | 1 | 2 |
| 15 | 0.3 | 170±5 | 159±5 | 107 | 0.57±0.07 | 1.21±0.22 | 47 | 2 | 2 |
| 16 | 0.3 | 161±3 | 156±3 | 104 | 0.66±0.08 | 1.19±0.10 | 55 | 4 | 3 |
| 17 | 0.3 | 156±7 | 156±3 | 100 | 0.75±0.05 | 1.19±0.10 | 63 | 3 | 3 |
| 18 | 0.3 | 122±3 | 161±3 | 76 | 0.55±0.09 | 1.11±0.18 | 50 | 1 | 2 |
| 19 | 0.3 | 155±6 | 161±3 | 96 | 0.63±0.08 | 1.11±0.18 | 57 | 1 | 2 |
| 21 | 0.3 | 162±5 | 141±7 | 115 | 0.63±0.07 | 1.26±0.10 | 50 | 2 | 3 |
| Atromid (mean of 10 tests) | 0.3 | 173 | 163 | 106 | 0.63 | 1.34 | 47 | 2 | 3 |

B. Effect on the level of cholesterol and triglycerides in rat plasma

Male rats of the Sprague-Dawley strain with a level of total cholesterol exceeding 180 mg per 100 ml plasma were used. Each group consisted of 6 rats. The rats were fed a diet supplemented with test substance, 0.3 % w/w, for 6 days. Blood samples were taken immediately before the start of the experiment and after 6 days. The samples were taken by the morbital eye technique, i.e. out of the ophthalmic venous complex, without sacrificing the animals. The individual rats could thus serve as their own controls.

Diet

The rats were fed commercial rat chow obtained from Astra-Ewos, Sodertalje, Sweden, ground and supplemented with the test substances.

Results

The results are collected in Table III below. All compounds tested reduce the plasma levels of cholesterol and triglycerides, compounds 7 and 18 being more active than Atromid.

Table III

| Compound No. | Total cholesterol in % of initial values (day 0) | Triglycerides in % of initial values (day 0) |
|---|---|---|
| 2 | 91 ± 3 | 89 ± 5 |
| 3 | 92 ± 9 | 78 ± 6 |
| 7 | 63 ± 5 | 52 ± 6 |
| 18 | 71 ± 3 | 37 ± 5 |
| Atromid (mean of 3 tests) | 76 | 66 |

What we claim is:

1. A method for lowering serum lipid concentration in animals, including man, which comprises administering to an animal in need of such treatment, as the active ingredient, a therapeutically effective amount of a compound of the formula

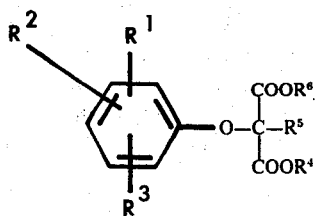

or a therapeutically acceptable salt thereof, wherein $R^1$ is selected from the group consisting of halogen, alkyl groups containing from 1 to 4 carbon atoms, alkoxy groups containing 1 to 4 carbon atoms, and trifluoromethyl; $R^2$ and $R^3$ are the same or different and are selected from the group consisting of hydrogen, halogen, alkyl groups containing from 1 to 4 carbon atoms, alkoxy groups containing from 1 to 4 carbon atoms, and trifluoromethyl; $R^4$ and $R^6$ are the same or different and are selected from the group consisting of hydrogen and alkyl containing from 1 to 4 carbon atoms; and $R^5$ is an alkyl group containing from 1 to 4 carbon atoms, in association with a pharmaceutically acceptable carrier.

2. A method according to claim 1 wherein $R^1$, $R^2$, and $R^3$ are the same or different and are selected from the group consisting of $Cl_3$, I, F, CH, $OCH_3$, and $CF_3$.

3. A method according to claim 2 wherein $R^4$ and $R^6$ are both $C_2H_5$ and $R^5$ is $CH_3$.

4. A method according to claim 3 wherein $R^1$ is 2-methyl and $R^2$ and $R^3$ are hydrogen.

5. A method according to claim 3 wherein $R^1$ is 3-methyl and $R^2$ and $R^3$ are hydrogen.

6. A method according to claim 3 wherein $R^1$ is 4-methyl and $R^2$ and $R^3$ are hydrogen.

7. A method according to claim 3 wherein $R^1$ is 2-chloro and $R^2$ and $R^3$ are hydrogen.

8. A method according to claim 3 wherein $R^1$ is 4-chloro and $R^2$ and $R^3$ are hydrogen.

9. A method according to claim 3 wherein $R^1$ is 3-iodo and $R^2$ and $R^3$ are hydrogen.

10. A method according to claim 3 wherein $R^1$ is 4-iodo and $R^2$ and $R^3$ are hydrogen.

11. A method according to claim 3 wherein $R^1$ is 2-methoxy and $R^2$ and $R^3$ are hydrogen.

12. A method according to claim 3 wherein $R^1$ is 3-methoxy and $R^2$ and $R^3$ are hydrogen.

13. A method according to claim 3 wherein $R^1$ is 4-trifluoromethyl and $R^2$ and $R^3$ are hydrogen.

14. A method according to claim 3 wherein $R^1$ is 2-methyl, $R^2$ is 3-methyl, and $R^3$ is hydrogen.

15. A method according to claim 3 wherein $R^1$ is 2-methyl, $R^2$ is hydrogen, and $R^3$ is 4-methyl.

16. A method according to claim 3 wherein $R^1$ is 2-methyl, $R^2$ is hydrogen, and $R^3$ is 5-methyl.

17. A method according to claim 3 wherein $R^1$ is 3-methyl, $R^2$ is hydrogen, and $R^3$ is 4-methyl.

18. A method according to claim 3 wherein $R^1$ is 3-methyl, $R^2$ is hydrogen, and $R^3$ is 5-methyl.

19. A method according to claim 3 wherein $R^1$ is 2-chloro, $R^2$ is hydrogen, and $R^3$ is 6-methyl.

20. A method according to claim 3 wherein $R^1$ is 2-methyl, $R^2$ is hydrogen, and $R^3$ is 4-chloro.

21. A method according to claim 3 wherein $R^1$ is 3-methyl, $R^2$ is 4-chloro, and $R^3$ is hydrogen.

22. A method according to claim 3 wherein $R^1$ is 2-methyl, $R^2$ is hydrogen, and $R^3$ is 4-fluoro.

23. A method according to claim 3 wherein $R^1$ is 2-chloro, $R^2$ is 4-chloro, and $R^3$ is hydrogen.

24. A method for lowering the serum level of triglycerides in animals including man, characterized in administration to a host in need of such treatment a therapeutically effective amount of a pharmaceutical preparation according to claim 1.

25. A method for lowering the serum level of cholesterol in animals including man, characterized in administration to a host in need of such treatment a therapeutically effective amount of a pharmaceutical preparation according to claim 1.

26. A method for lowering the serum levels of triglycerides and cholesterol in animals including man, comprising administration to a animal host in need of said treatment a therapeutically effective amount of a compound selected from the group consisting of

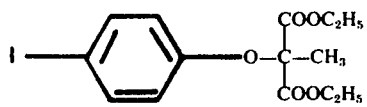

and

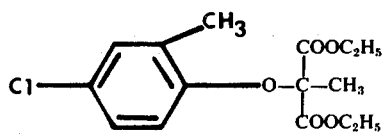

* * * * *

UNITED STATES PATENT AND TRADEMARK OFFICE
CERTIFICATE OF CORRECTION

PATENT NO. : 3,928,602
DATED : December 23, 1975
INVENTOR(S) : DAG VILHELM BARTHOLD, et al It is certified that error appears in the above-identified patent and that said Letters Patent are hereby corrected as shown below:

Column 10, line 50, "$Cl_3$" should read --Cl-- and "CH" should read --$CH_3$--.

Signed and Sealed this eighteenth Day of May 1976

[SEAL]

Attest:

RUTH C. MASON
*Attesting Officer*

C. MARSHALL DANN
*Commissioner of Patents and Trademarks*